United States Patent [19]

Ferguson et al.

[11] Patent Number: 5,745,713
[45] Date of Patent: Apr. 28, 1998

[54] MOVIE-BASED FACILITY FOR LAUNCHING APPLICATION PROGRAMS OR SERVICES

[75] Inventors: Gregory J. Ferguson, Hunt Valley, Md.; Bryan D. Clapper, Fort Collins, Colo.

[73] Assignee: Silicon Graphics, Inc., Mountain View, Calif.

[21] Appl. No.: 511,051

[22] Filed: Aug. 3, 1995

[51] Int. Cl.$^6$ ........................................... G06F 3/14
[52] U.S. Cl. .................. 395/339; 395/977; 395/348; 395/807; 395/327; 395/972
[58] Field of Search ........................ 395/339, 977, 395/348, 978, 354, 327, 328, 972, 806, 807, 173, 960, 159, 155, 157, 154, 156, 152, 326, 340, 352, 949

[56] References Cited

U.S. PATENT DOCUMENTS

| | | | |
|---|---|---|---|
| 5,303,388 | 4/1994 | Kreitman et al. | 395/348 |
| 5,377,319 | 12/1994 | Kitahara et al. | 395/173 X |
| 5,479,602 | 12/1995 | Baecker et al. | 395/977 X |
| 5,524,195 | 6/1996 | Clanton, III et al. | 395/327 |
| 5,544,295 | 8/1996 | Capps | 395/173 |
| 5,550,967 | 8/1996 | Brewer et al. | 395/977 X |

OTHER PUBLICATIONS

Y. Tonomura et al., "Content Oriented Visual Interface Using Video Icons for Visual Database Systems", IEEE, 1989, pp. 68–73.

*Primary Examiner*—Raymond J. Bayerl
*Attorney, Agent, or Firm*—Sterne, Kessler, Goldstein & Fox P.L.L.C.

[57] ABSTRACT

A movie-based facility for launching applications or services. A launchpad or pallet of icons is provided to a user. The launchpad is part of a graphical user interface. Each icon has a display region. A user can launch an application program by pressing the icon and concurrently therewith display a movie within the display region of the icon during the latency period associated with the launching of the application program.

22 Claims, 3 Drawing Sheets

MOVIE-BASED FACILITY FOR LAUNCHING APPLICATION PROGRAMS OR SERVICES

BACKGROUND OF THE INVENTION

1. Field of the Invention

The present invention relates to the field of graphical user interfaces, and more particularly, to the display of an icon that when selected launches application programs or services while concurrently displaying a movie within a region of the icon.

2. Related Art

The launching of application programs or services typically have latency that is visible to a user. This latency can be frustrating to the user, because it is perceived by the user as wasted time.

Conventional graphical user interfaces (GUI's) provide icons or buttons for selecting applications or services. These icons or buttons typically provide users with feedback when an application or service is selected to occupy the user during the period of latency caused by the selection. For example, when a user selects an application by clicking an icon using a mouse, or other pointer device, the cursor statically changes appearance to indicate to the user that the selection is being processed. In Microsoft Windows™ and Macintosh™ the cursor changes to an hourglass and watch, respectively.

Status display graphs are used to provide feedback to the user during operations, such as file transfers. For example, bar graphs are used to display the percentage of time remaining until completion of an event, or the amount of work completed. However, these status display graphs are graphically positioned apart from the icon, and act to clutter the display and tire the user's eyes.

SUMMARY OF THE INVENTION

The present invention provides a movie-based facility for launching applications or services. A launchpad or pallet of icons is provided to a user. The launchpad is part of a graphical user interface. Each icon has a display region. A user can launch an application program by pressing the icon. The present invention displays a movie within the display region of the icon during the latency period associated with the launching of the application program. That is, the movie is displayed concurrently with the launching of the application program. In a preferred embodiment, the movie has a video portion and an audio portion.

BRIEF DESCRIPTION OF THE DRAWINGS

The foregoing and other features and advantages of the invention will be apparent from the following, more particular description of a preferred embodiment of the invention, as illustrated in the accompanying drawings.

The preferred embodiment of the invention is now described with reference to the figures where like reference numbers indicate like elements. Also in the figures, the left most digits of each reference number corresponds to the figure in which the reference number is first used.

DETAILED DESCRIPTION OF THE PREFERRED EMBODIMENTS

Figure 1:
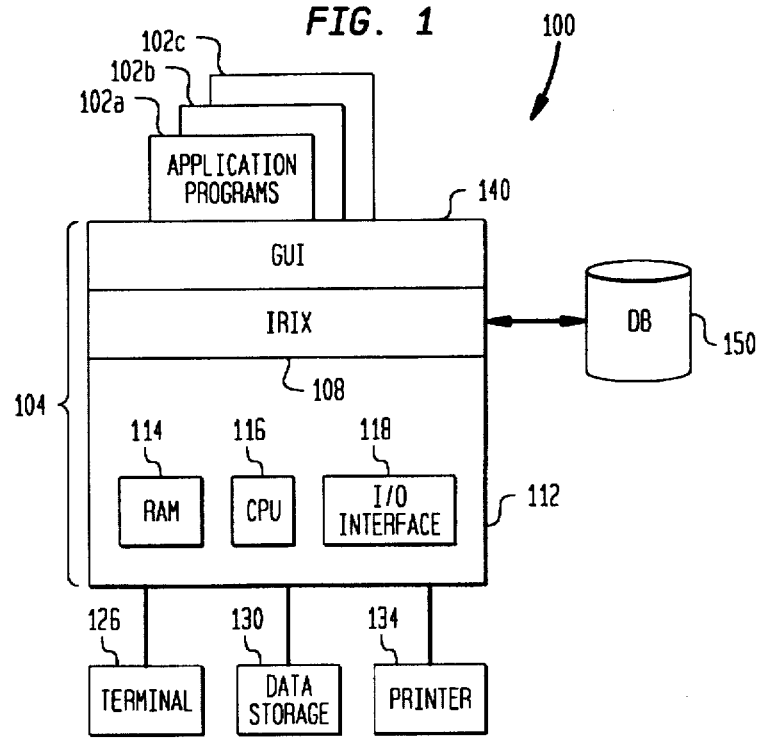
FIG. 1 illustrates a general hardware environment in which a preferred embodiment of the present invention can operate.

FIG. 1 illustrates a general hardware environment in which a preferred embodiment of the present invention can operate. The environment 100 of the present invention includes application programs 102a, 102b and 102c. Computer platform 104 includes a hardware unit 112, which includes potentially multiple central processing units (CPUs) 116, a random access memory (RAM) 114, and an input/output interface 118. Computer platform 104 includes an operating system 108. Various peripheral components can be connected to computer platform 104, such as a graphics terminal 126, a data storage device 130, and a printing device 134.

Computer platform 104 is any personal computer, workstation or mainframe computer. In a preferred embodiment, CPU 116 is any processor from the MIPS™ family of processors including R3000. Operating System 108 can be any operating system compatible with computer platform 104. In a preferred embodiment, operation system 108 is the IRIX™ operating system version 5.3 or greater available from Silicon Graphics. IRIX supports an X Window System server (Xsgi) with an extended X/Motif-based window manager (4Dwm) as its graphical user interface (GUI) 140. Operating system 108 must provide a mechanism for multitasking. Operating system 108 is further connected to access a database 150 or other storage media. In a preferred embodiment, database 150 is configured to store movies.

Figure 2:
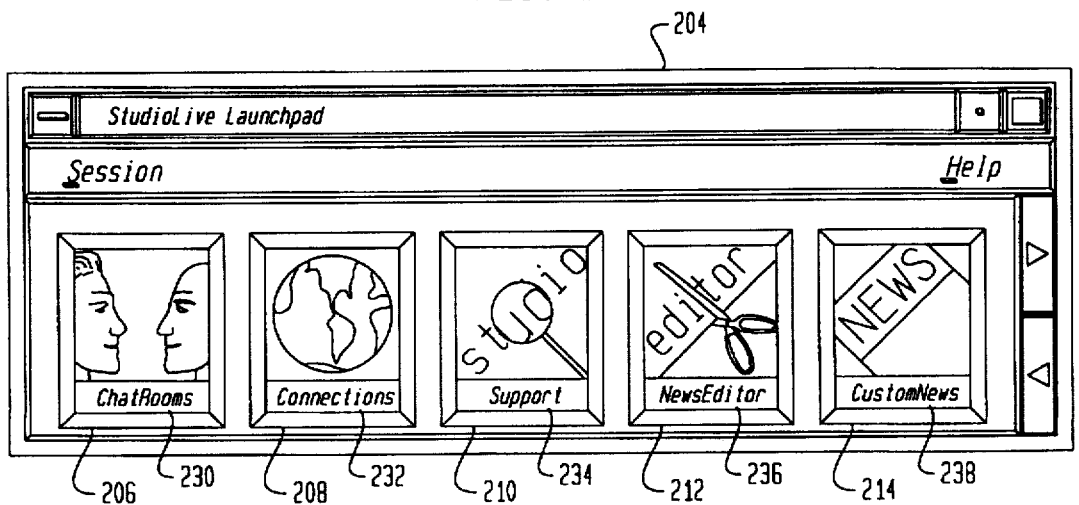
FIG. 2 illustrates a launchpad having a plurality of icons that are adapted to display a movie in accordance with the present invention.

FIG. 2 illustrates the present invention. Launchpad 204 is a window within a graphical user interface (not shown) displayed on graphics terminal 126.

Launchpad 204 includes a plurality (or palette) of movie icons 206-214 that allow an end-user to launch an application program or service. Examples of application programs that can be launched include word processors, spreadsheets, games, etc. Launchpad 204 is completely customizable. That is, a user can select which icons can be accessed via launchpad 204. In an alternate embodiment, launchpad 204 may include only a single icon or a single icon may be displayed within the graphical user interface independent of launchpad 204.

Each movie icon 206-214 has a display region 230-238. Each individual movie icon 206-214 further displays a movie within display region 230-238 when activated. That is, when an end-user launches an application program or service by clicking on a movie icon or otherwise selecting a movie icon using a pointing device, a movie is displayed within display region 230-238 of activated icon 206-214. Each icon further has a content dependent message within display region 230-238 which indicates the functionality that can be accessed by clicking the associated icon. For example, icon 212 has the message "NewsEditor," which indicates that an editor can be launched for editing news clips.

In a preferred embodiment, Silicon Graphics™, MPEG™ and Apple QuickTime™ are the film formats and compression schemes utilized by the present invention. However, any film format can be used as should be apparent to one skilled in the art. Icons 206-214 are referred to herein as movie icons. The term "movie" as used herein means any video, either animation or motion picture, with or without audio.

In a preferred embodiment, each icon 206–214 is constructed as a set of X/Motif widgets (XmForm/XmLabel), along with a Silicon Graphics OpenGL drawing area widget. However, any known or future developed technique for constructing icons and windows is contemplated by the present invention. In a preferred embodiment, each icon responds to the position of a cursor (not shown) in a manner known as "locate-highlight." As the cursor passes over an individual icon, the icon's border/frame changes tone (i.e., from dark to light). That is, there is a state change within the icon. When the cursor passes outside of the icon, the border frame reverts back to its original color (e.g., a dark color).

Figure 3:
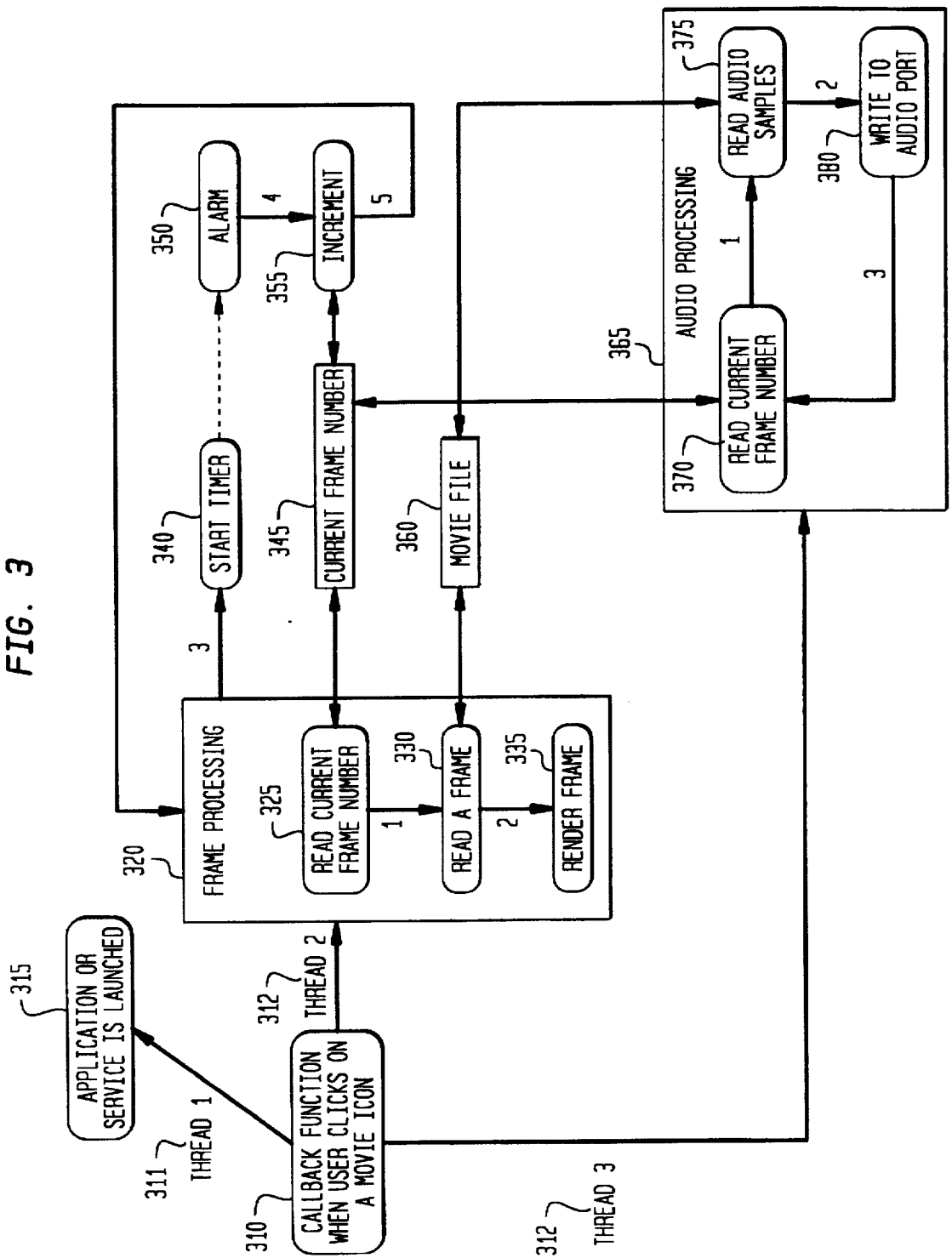
FIG. 3 illustrates a flow diagram that illustrates the operation of the present invention.

FIG. 3 illustrates a flow diagram that illustrates the operation of the present invention. A user clicks on (or activates) a desired application or service represented by movie icons 206–214. This step is illustrated in block 310. The activation of a movie icon 206–214 triggers a "callback function." A callback function is a software module that is called in response to clicking a cursor (or the like). In a preferred embodiment, three threads of execution 311–313 are activated by block 310. As discussed above, operating system 108 is multitasking (i.e., allows multiple, parallel threads of execution). Threads of execution are well known in the art, and for the sake of brevity will not be described in detail herein. However, it is important to realize that all three threads of execution execute in parallel.

A first thread of execution 311 is the launching of an application or service desired by an end-user. This is shown in block 315. A second thread of execution 312 displays a movie within a specified movie icon 206–214 (i.e., the movie icon activated by an end-user). This is shown in frame processing block 320. A third thread of execution 312 is the playing of an audio track. This is shown in audio processing block 365. Frame processing block 320 and audio processing block 365 access a current frame number block 345 and a movie file block 360. Additionally, frame processing block further accesses a timer block 340, which in turn activates an alarm block 350 and an increment block 355. In a preferred embodiment, a program for displaying the icon(s), a program for launching an application or service and a program for displaying a movie are within a single executable. Each of these blocks will be described in further detail below.

Frame processing block 320 includes a read current frame number block 325, read frame block 330 and render frame block 335. Movies are stored as a series of frames. The movie comprises a video track and an audio track. For example, a three second movie may consist of approximately ninety (90) frames. Block 325 reads the current frame number from block 345. Next, block 330 reads a frame from a movie as specified by the current frame number. The movie is stored in movie file 360. The movie may be stored in either compressed or uncompressed form. If it is stored in compressed form it must be uncompressed before being rendered within a movie icon. The current frame is stored to a frame buffer (not shown).

Block 335 then renders the image within the frame buffer into (or within the border of) the movie icon. In a preferred embodiment, this is known as rendering the movie into an OpenGL drawing area widget. Immediately thereafter, frame processing block 320 activates a timer, as shown in block 340. Once a specified period has elapsed an alarm is activated, as shown in block 350. The alarm alerts the frame processing block 320 that a new frame needs to be rendered. The time is based on the desired frame rate the creator of the movie has set. In a preferred embodiment, the frame rate is set to 30 frames per second. Once the alarm is activated, block 355 increments the current frame number, as shown in block 345. At this point, frame processing block 320 starts the process of rendering the next frame. The process continues until the video track is complete.

Each movie may also contain an audio track. The audio track is played via audio processing block 365. Audio processing block 365 is similar to video processing block 320. First, the current frame number is read, as shown in block 370. Next the audio samples are read from the movie file 360, as shown in block 375. The audio sample is stored in a buffer. Finally, the audio sample is written to an audio port, as shown in block 380. This process is repeated until the audio track is complete.

Figure 4:
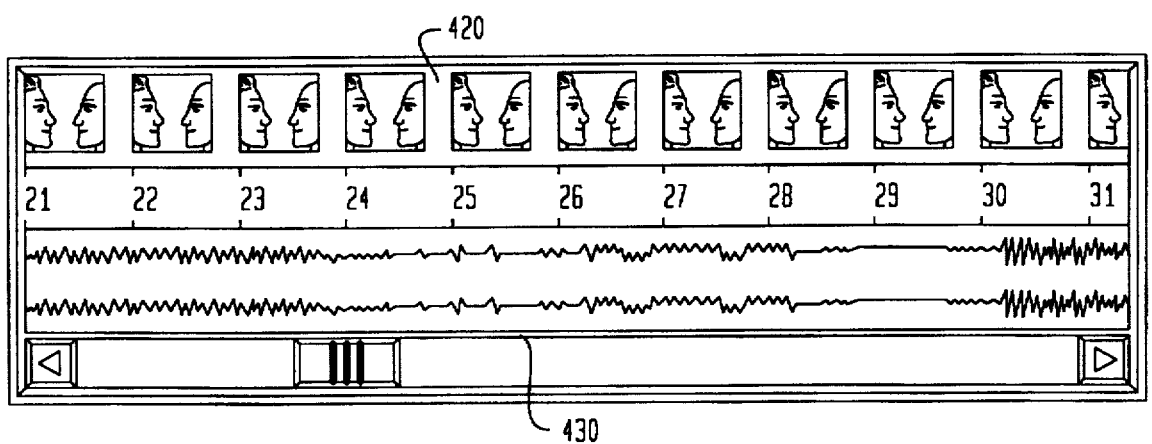
FIG. 4 illustrates a movie file having a video track and an audio track.

FIG. 4 illustrates the format of a movie file composed of two separate tracks: a video track 420 and an audio track 430. Video track 420 contains a series of images. Audio track 430 contains a series of audio samples. Video track 420 and audio track 430 are synchronized. As described above, frame processing block 320 and audio processing block 365 read current frame number block 345 in order to access the correct track. Storing the current frame number in a single location guarantees that video track 420 and audio track 430 will be synchronized.

In one embodiment, the present invention is a computer program product that includes a floppy disk, compact disk, etc. also referred to as a computer usable medium, having control logic recorded thereon. The control logic, when loaded into memory 114 and executed by the CPU 116, enables the CPU 116 to perform the operations described herein. Accordingly, such control logic represents a controller, since it controls the CPU 116 during execution.

In a preferred embodiment, the movie runs until completion regardless of whether the application program can be launched in less time. It is contemplated, however, that the movie can be severed once the launching of the application is complete. This can be accomplished by establishing a communication link between thread 311 and threads 312 and 312. In this alternate embodiment, the movie can also be severed if an error occurs in trying to launch the application program.

While the invention has been particularly shown and described with reference to preferred embodiments thereof, it will be understood by those skilled in the art that various changes in form and details may be made therein without departing from the spirit and scope of the invention.

What is claimed is:

1. In a computer-based system having a graphical user interface, a movie-based facility for launching applications or services for use with the graphical user interface, comprising:

a first application program that provides an arbitrary function to occur within the computer-based system;

a second application program that displays a movie having at least a video portion; and means for displaying an icon having a border and a display region wherein said display region is located within said border, said icon located within the graphical user interface, wherein said icon permits a user to launch said first application program and said second application program concurrently, wherein said movie is displayed within said display region.

2. The movie-based system of claim 1, wherein said second application program and said means for displaying comprise a single executable.

3. The movie-based facility of claim 1, wherein said movie includes an audio portion.

4. The movie-based facility of claim 1, wherein said movie is no longer displayed once the launching of said first application is complete.

5. In a computer-based system having a graphical user interface, a movie-based facility for launching applications or services for use with the graphical user interface, comprising:

an icon, located within the graphical user interface that permits a user to launch a first application program and the applications or services concurrently, said icon having a border and a display region, wherein said display region is located within said border;

wherein said first application program displays a movie within said display region, said movie having at least a video portion.

6. The movie-based facility of claim 5, wherein said movie includes an audio portion.

7. In a computer-based system having a graphical user interface, a movie-based facility for launching applications or services for use with the graphical user interface, comprising:

a first application program that displays a movie; and an icon, located within the graphical user interface that permits a user to launch said first application program and a second application program concurrently, said icon having a border and a display region, wherein said display region is located within said border and said movie is displayed within said display region.

8. The system of claim 7, wherein said movie has an audio and a video portion.

9. The system of claim 7, wherein said icon is displayed within a window having a plurality of icons, each of which has a display region where a further movie is displayed.

10. The system of claim 7, wherein said icon has a context dependant label that identifies said first application program.

11. The system of claim 10, wherein said icon has a border that changes in appearance when a cursor passes said border.

12. The system of claim 7, wherein said first application program and said second application program are executed as separate threads of execution.

13. The system of claim 12, wherein said first application program is executed as two separate threads of execution, including a video thread and an audio thread.

14. The movie-based facility of claim 7, wherein said movie is no longer displayed once the launching of said applications or services are complete.

15. In a computer-based system having a graphical user interface, a method for launching applications or services, comprising the steps of:

displaying an icon in the graphical user interface, said icon having a border and a display region, wherein said display region is located within said border;

displaying a movie in said display region in response to a user selecting said icon; and launching, concurrently with said step of displaying said movie, the applications or services.

16. The method of claim 15, wherein said step of displaying comprises the synchronized steps of displaying a video portion and outputting an audio portion.

17. The method of claim 15, further comprising the step of displaying said icon in a window having a plurality of further icons each having a display region where further movies are displayed.

18. The method of claim 15, further comprising the step of displaying a context dependant label in said icon that identifies the applications or services.

19. The method of claim 15, further comprising the step of altering the appearance of said icon when a cursor passes said icon.

20. The method of claim 15, wherein said step of displaying includes the step of executing two separate threads of execution, including a video thread and an audio thread.

21. A computer program product for use with a graphics display device, comprising:

a computer-readable medium having computer readable program code means embodied in said medium, said computer readable program code means comprising:

first computer readable program code means configured for causing a computer based system to execute an arbitrary function;

second computer readable program code means configured for causing said computer-based system to display a movie having at least a video portion; and third computer readable program code means configured for causing said computer-based system to display an icon on the graphics display device, said icon having a border and a display region, wherein said display region is located within said border, wherein said icon permits a user to launch said first computer readable program code means and said second computer readable program code means concurrently, wherein said movie is displayed within said display region.

22. The computer-program product of claim 21, wherein said movie includes an audio portion.

* * * * *